Patented Jan. 11, 1949

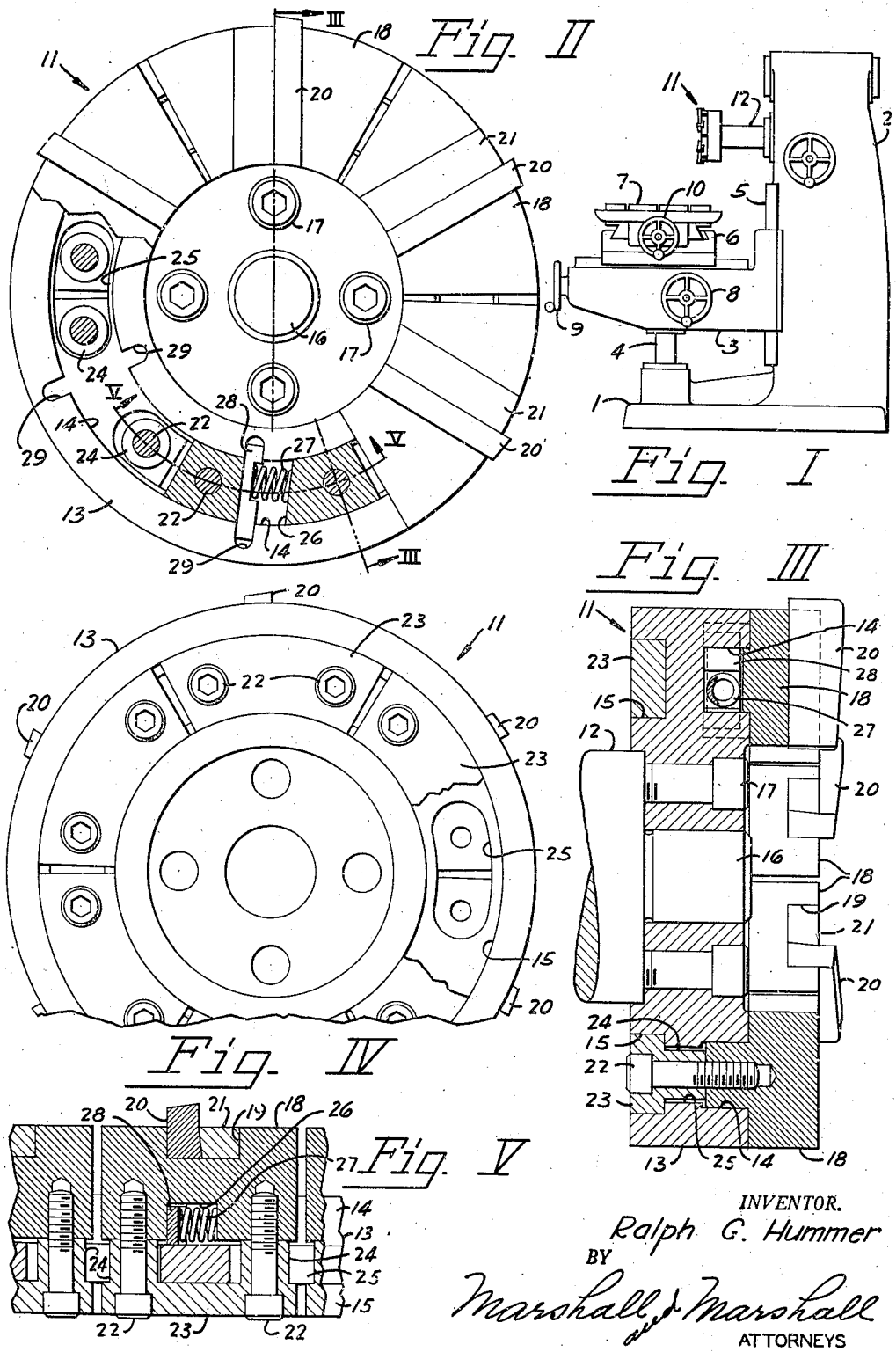

2,458,995

UNITED STATES PATENT OFFICE 2,458,995

CUTTER TOOL VIBRATION CONTROL

Ralph G. Hummer, Defiance, Ohio, assignor to Defiance Machine Works, Inc., Defiance, Ohio, a corporation of Ohio Application July 7, 1945, Serial No. 603,629

5 Claims. (Cl. 29—105)

This invention relates to metal cutting apparatus, and in particular to means for securing uniform motion of metal cutting tools such as milling cutter teeth.

It has been observed that torsional vibration is set up in a milling machine spindle or a boring machine spindle when the cutter teeth intermittently engage the workpiece being machined. The source of the vibration is the variation in torque produced as the cutter teeth engage the work. In some cases the size and shape of the workpiece being machined may be such that the number of the cutter teeth engaged with the work varies periodically during each revolution of the cutter. This vibration is one of the factors contributing to short tool life when cemented carbide tipped tools are used in the cutter. Considerable breakage of these tools has been experienced and has been traced to a momentary stoppage of the toolholder which occurs when a cutter tooth engages the work. This momentary stoppage or in some cases slight reversal of the cutter body produces tensile forces tending to disintegrate the cemented carbide cutter tooth tips.

The principal object of this invention is to resiliently drive the cutter teeth so that small sudden changes in velocity will not be transmitted from one cutter tooth to another.

Another object of the invention is to mount the cutter teeth in a cutter body in such a manner that they may move circumferentially with respect to the cutter body but are guided against radial or axial movement with respect to the cutter body.

A still further object is to provide a simple milling machine cutter having resiliently driven toolholders.

These and other objects and advantages are apparent from the following description in which reference is made to the accompanying drawings.

In the drawings:

Figure I is a side elevation of a machine tool in which the improved cutter may be employed.

Figure II is a front elevation, with parts broken away and other parts shown in section, of the improved cutter body.

Figure III is a vertical section taken substantially along the line III—III of Figure II.

Figure IV is a back elevation, with parts broken away, of the improved cutter body.

Figure V is a sectional view taken substantially along the line V—V of Figure II.

These specific figures and the accompanying description are intended merely to illustrate a preferred embodiment of the invention and are not intended as a limitation upon the claims.

According to the invention stresses on the cutter teeth or oscillatory vibration of the cutter with respect to the drive are reduced by mounting the individual toolholders on the cutter body so that they are individually resilient in torque but are rigidly guided aganist lateral or axial deflection. When the individual teeth are so mounted the cutter body does not tend to slow up or stop momentarily as each of the teeth engages the work. The resilient mounting allows each tooth to hesitate momentarily as it engages the work but that hesitation is not transmitted through the cutter body to affect those cutters already engaged with the work. This isolation of one cutter from another protects the cutter teeth from all tensile forces thereby prolonging the life of the cutter teeth. The invention is of particular advantage when cemented carbide tipped tools are employed because such tools, while strong in compression, are brittle and relatively weak in tension.

The improved cutter may be used in any rotary cutter machine tool such as a milling machine or a boring mill. Such a machine (as shown in Figure I) comprises a base 1 and a column 2 erected on the base 1. A knee 3 carried on an elevating screw 4 and guided by ways 5 on the column 2 provides support for a saddle 6 which in turn supports a platen 7. Hand wheels 8, 9 and 10 control respectively the vertical position, the fore and aft position and the lateral position of the platen 7 with respect to a cutter body 11 carried on a rotating spindle 12.

The cutter body 11 consists of a disk 13 having an annular groove 14 cut in its front face and a similar annular groove 15 cut in its rear face, each groove being concentric with the axis of the spindle 12. The disk 13 is guided by a pilot 16 in the end of the spindle 12 and is secured to the spindle by a series of bolts 17.

A plurality of sector shaped toolholders 18, T shaped in cross section, are mounted on the face of the disk 13 in engagement with the annular groove 14. The toolholders 18 are each provided with a groove 19 (Figure V) in which a cutting tooth 20 may be secured by a wedge 21. The cutting teeth 20 may be entirely of tool steel or may be tipped with a cemented carbide. Each of the tool holders 18 is secured in place by a pair of bolts 22 which clamp sector shaped blocks 23 fitted within the annular groove 15 to the toolholders 18. The sector shaped blocks 23 are provided with cylindrical bosses 24 extending through slots 25 cut through the web of the disk 13 between the grooves 14 and 15. The toolholders 18 are free to move circumferentially on the disk 13 through a distance determined by the clearance between the cylindrical bosses 24 and the ends of the slots 25. They are rigidly guided by the grooves 14 and 15 so that they have no appreciable axial or radial motion with respect to the disk 13.

A notch 26, radial with respect to the disk 13, is cut through the stem of each of the toolholders 18 to a depth substantially equal to the depth of the annular groove 14 to accommodate a helical compression spring 27 and a retaining key 28. The retaining keys 28 are long enough to engage notches 29 cut in the side walls of the groove 14. The springs 27 and the keys 28 are assembled in such a manner as to urge the toolholders 18 forwardly in the direction of rotation of the disk 13 and spindle 12. The springs 27 are preloaded so that normally the key 28 is pushed against the edge of the notch 26. Under the influence of normal cutting pressures on the cutting teeth 20 the cutter body 18 slides in the groove 14 and slightly compresses the spring 27. It is the resiliency of these springs and the flexibility of the drive taken through them that severs the direct connection between the various cutting teeth and allows the individual cutting teeth of the cutter body to stop momentarily as each tooth engages the work. In the improved cutter body each tooth is allowed to individually hesitate as it engages the work but that hesitation does not materially affect the constant velocity of the cutter body itself. In consequence one of the important factors contributing to the breakage of cutter teeth is eliminated with no sacrifice of other desirable features of a compact cutter body.

While the preferred form of the invention has been illustrated, the invention contemplates modifications of the structure to adapt it to various conditions encountered in practice.

Having described the invention, I claim:

1. In a device of the class described, in combination, a disk suitable for mounting on a rotatable spindle, a plurality of toolholders carrying tools that are successively applied to the work, said toolholders being movably mounted on the disk for movement independently of each other circumferentially with respect to the disk, and resilient means acting between the disk and the toolholders for urging the toolholders in the direction of rotation of the disk when mounted on the spindle.

2. In a device of the class described, in combination, a disk suitable for mounting on a machine tool spindle, a plurality of toolholders carrying tools that are successively applied to the work, said toolholders being individually movably mounted on the disk for movement circumferentially with respect to the disk, and a spring interposed between each toolholder and the disk to urge the toolholder in the direction of rotation of the disk when mounted on the spindle.

3. In a device of the class described, in combination, a disk adapted to be mounted on a machine tool spindle, the disk being provided with an annular groove in its face, a plurality of toolholders mounted on the disk and slidable along the annular groove, and resilient means acting between the disk and the toolholders adapted to urge the toolholders in the direction of rotation of the disk when mounted on the spindle.

4. In a device of the class described, in combination, a disk adapted to be mounted on a machine tool spindle, the disk having annular grooves in its faces, a plurality of toolholders slidably mounted in one of the grooves, a plurality of blocks slidably mounted in the other groove, the toolholders and blocks being secured in their respective grooves by bolting means extending through the disk, and resilient means adapted to urge said toolholders in the direction of rotation of the disk.

5. In a device of the class described, in combination, a disk adapted to be mounted on a machine tool spindle, the disk having annular grooves in its faces, a plurality of toolholders slidably mounted in one of the grooves, a plurality of blocks slidably mounted in the other groove, the toolholders and blocks being secured in their respective grooves by bolting means extending through the disk, and coil springs adapted to urge said toolholders in the direction of rotation of the disk.

RALPH G. HUMMER.

REFERENCES CITED

The following references are of record in the file of this patent:

UNITED STATES PATENTS

| Number | Name | Date |
|---|---|---|
| 1,735,594 | Anderson | Nov. 12, 1929 |
| 1,746,462 | Cravens | Feb. 11, 1930 |
| 1,788,761 | Ernst | Jan. 13, 1931 |
| 2,058,229 | Hodgkins | Oct. 20, 1936 |
| 2,250,369 | Gorton | July 22, 1941 |